United States Patent [19]
Coughlin

[11] Patent Number: 5,572,969
[45] Date of Patent: Nov. 12, 1996

[54] ENGINE SHUT-OFF SWITCH

[76] Inventor: Todd J. Coughlin, Coleman Box 25, Prince Edward Island, Canada, C0B 1H0

[21] Appl. No.: 596,742

[22] Filed: Feb. 5, 1996

[51] Int. Cl.$^6$ .......................... F02D 11/06; H01H 35/02; B60K 28/14
[52] U.S. Cl. ................... 123/198 DC; 180/282; 200/52 A
[58] Field of Search ........................ 123/198 D, 198 DB, 123/198 DC; 200/52 A, 61.52; 180/282

[56] References Cited

U.S. PATENT DOCUMENTS 1,611,219 12/1926 Minninger ..................... 123/198 DC X
4,377,210 3/1983 Monte ................... 180/282 X

*Primary Examiner*—Tony M. Argenbright

[57] ABSTRACT

A engine shut-off switch including a generally V-shaped pipe that has a first pipe end and a second pipe end. The pipe has a mounting bracket that is attached. The mounting bracket is mounted to a fire wall of a vehicle. A solid ball is positioned within an interior surface area of the pipe. A pair of L-shaped holding pins are provided. Each pin has an interior end, an exterior end with a pin head and a bridge. The exterior end projects from the inner side wall of the pipe. The interior end is attached to the interior surface. Lastly, a pair of toggle switches are included and attached to an opposite outer side wall of the pipe. Each switch has a connecting wire. Each switch has a bias spring-like lever that is attached to the inner surface of the outer wall. Each lever has a projecting member that is capable of movement between the inner surface of the pipe and the switch. The projecting member turns the switch off by pressing against a switch arm of the toggle switch, when the vehicle rolls on a side.

8 Claims, 3 Drawing Sheets

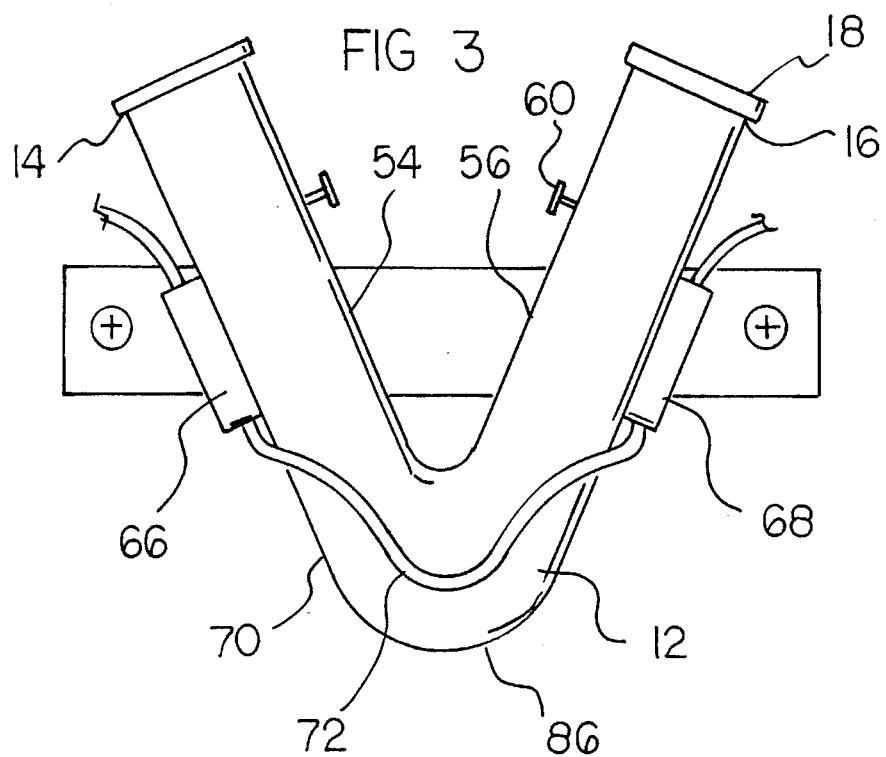
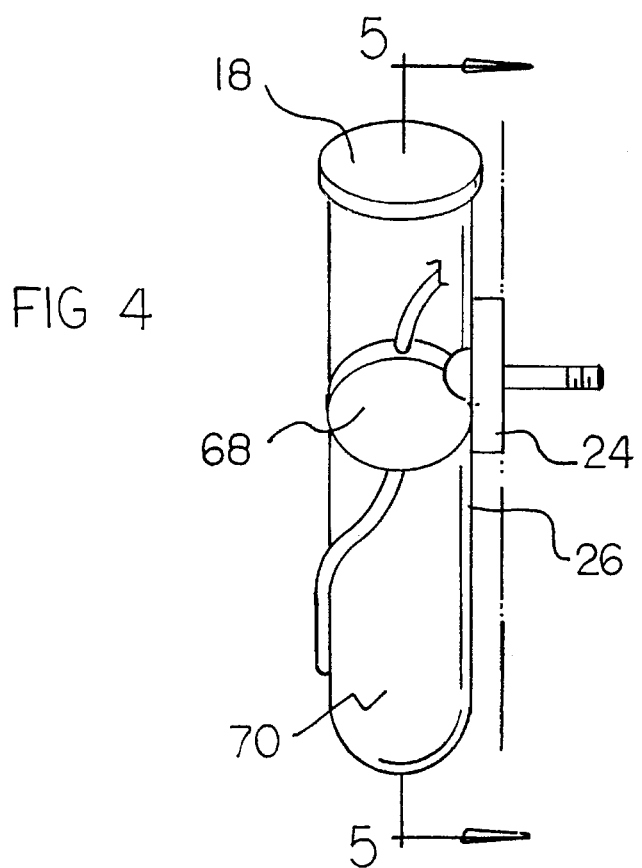

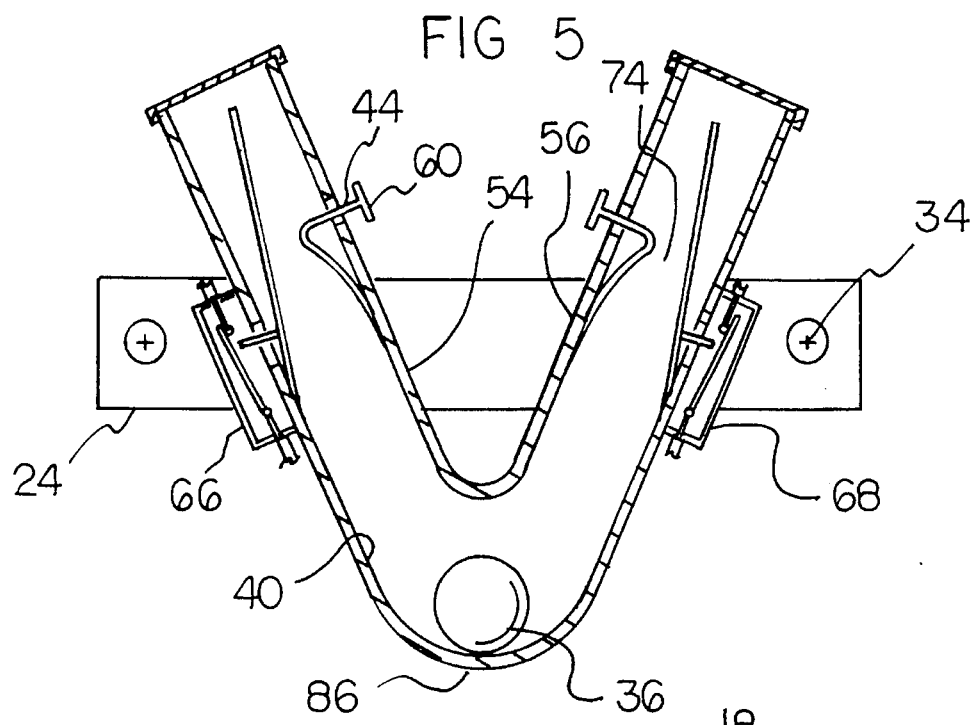
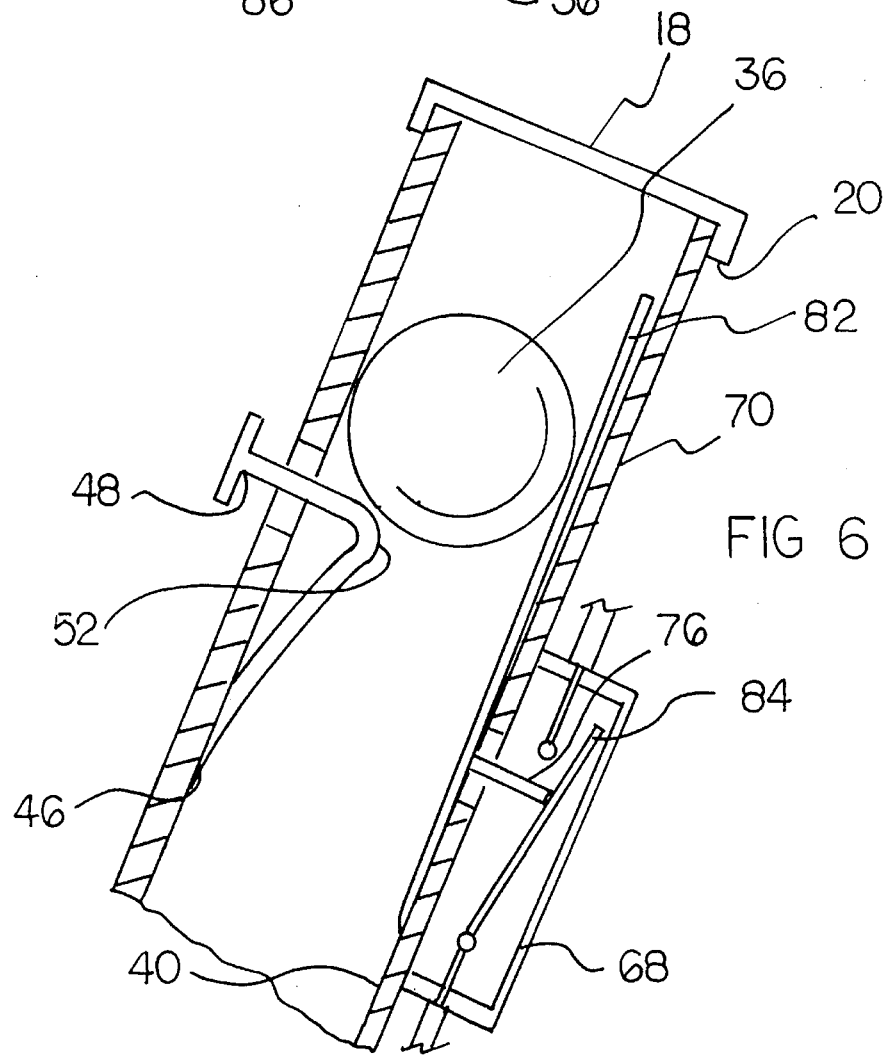

ENGINE SHUT-OFF SWITCH

BACKGROUND OF THE INVENTION

1. Field of the Invention

The present invention relates to a engine shut-off switch and more particularly pertains to providing a V-shaped pipe that contains a ball, which is normally held in contact with a switch, that provides a closed ignition circuit in response to a vehicle rolling over onto its side.

2. Description of the Prior Art

The use of ignition shut-off is known in the prior art. More specifically, ignition shut-off heretofore devised and utilized for the purpose of shutting off the ignition system of a vehicle are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 5,195,606 to Martyniuk discloses an emergency stopping apparatus for automotive vehicles. U.S. Pat. No. 4,636,604 to Gnomes, Jr. discloses an emergency ignition shutoff system. U.S. Pat. No. 4,426,563 to Grogan discloses a chainsaw safety switch. U.S. Pat. No. 3,938,613 to Raborn discloses a motor kill switch with operator attached tether. U.S. Pat. No. 3,915,225 to Springer discloses a vehicle roll-over engine fuel line shut-off valve. Lastly, U.S. Pat. No. 3,889,089 to Tomlin discloses a operation actuated ignition-kill device.

While these devices fulfill their respective, particular objectives and requirements, the aforementioned patents do not describe engine shut-off switch that allows a ball seated in a V-shaped pipe to roll over a switch and deactivate the ignition circuit, when the ball moves from a seated position to a remote position that is adjacent the switch attached to the pipe.

In this respect, the engine shut-off switch according to the present invention substantially departs from the conventional concepts and designs of the prior art, and in doing so provides an apparatus primarily developed for the purpose of providing a V-shaped pipe that contains a ball, which is normally held in contact with a switch, that provides a closed ignition circuit in response to a vehicle rolling over onto its side.

Therefore, it can be appreciated that there exists a continuing need for a new and improved engine shut-off switch which can be used for providing a V-shaped pipe that contains a ball, which is normally held in contact with a switch, that provides a closed ignition circuit in response to a vehicle rolling over onto its side. In this regard, the present invention substantially fulfills this need.

SUMMARY OF THE INVENTION

In view of the foregoing disadvantages inherent in the known types of ignition shut-off now present in the prior art, the present invention provides an improved engine shut-off switch. As such, the general purpose of the present invention, which will be described subsequently in greater detail, is to provide a new and improved engine shut-off switch and method which has all the advantages of the prior art and none of the disadvantages.

To attain this, the present invention essentially comprises a generally V-shaped pipe, that has a first pipe end and a second pipe end. Each pipe is sealed with a circular disc fixedly attached to the end. The pipe has a diameter between about 1 to 2 inches with each disc having a diameter slightly greater than the diameter of the pipe. The pipe has a length between 3 to 5 inches. The pipe has a rectangular mounting bracket that is fixedly attached to an underside of the pipe. The mounting bracket is mounted to a fire wall between an engine and the vehicle cab. A solid ball is in frictionless contact with the interior surface area of the pipe. The ball has a high density and a spherical diameter of about ½ to 1 inch. Also, a pair of L-shaped holding pins are included. Each pin has an interior end, and exterior end and a bridge therebetween. One of the holding pins is positioned on an inner side wall of the pipe, while another of the holding pins is positioned on another inner side wall of the pipe. Each exterior end has a pin head. The exterior end of each holding pin projects from the inner side wall of the pipe. The interior end of each holding pin is fixedly attached to the interior surface of the inner side wall. The bridge of each holding pin is capable of being moved, back and forth in relationship to the interior surface of the inner side wall, by pulling the pin head. A pair of toggle switches are included. Each switch is attached to an opposite outer side wall of the pipe and has a connecting wire between the switches. The pair of switches form a first switch and a second switch. The first switch is an electrical contact with an ignition switch of a vehicle. The second switch is an electrical contact with an ignition mechanism. Each switch has a bias spring-like lever that is attached to the inner surface of the outer wall. Each lever is opposite the bridge of one of the L-shaped holding pins and forms a gap therebetween. Each lever has a projecting member that is capable of movement between the inner surface of the pipe and the switch. Each switch has a switching arm that forms a contact bridge for passing current through the switch when the ignition switch is turned on. Lastly, the lever is capable of interrupting the current that passes across the contact bridge, while allowing the projecting member to push against the switch arm. The projecting member pushes against the switch arm, when the vehicle is rolled over to a side and the ball is passed through the gap to roll over onto the lever. Whereby, the ball is capable of maintaining a constant force against the lever when the bridge of one of the holding pins and the force of the lever, lockingly secures the ball adjacent the respective end of the pipe.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved engine shut-off switch which has all of the advantages of the prior art ignition shut-off and none of the disadvantages.

It is another object of the present invention to provide a new and improved engine shut-off switch which may be easily and efficiently manufactured and marketed.

It is further object of the present invention to provide a new and improved engine shut-off switch which is of durable and reliable constructions.

An even further object of the present invention is to provide a new and improved engine shut-off switch which is susceptible of a low cost of manufacture with regard to both materials and labor, and which accordingly is then susceptible of low prices of sale to the consuming public, thereby making such engine shut-off switch economically available to the buying public.

Still yet another object of the present invention is to provide a new and improved engine shut-off switch which provides in the apparatuses and methods of the prior art some of the advantages thereof, while simultaneously overcoming some of the disadvantages normally associated therewith.

Even still another object of the present invention is to provide a engine shut-off switch for providing a V-shaped pipe that contains a ball, which is normally held in contact with a switch, that provides a closed ignition circuit in response to a vehicle rolling over onto its side.

Lastly, it is an object of the present invention to provide a new and improved engine shut-off switch including a generally V-shaped pipe that has a first pipe end and a second pipe end with each pipe end sealed. The pipe has a mounting bracket that is attached. The mounting bracket is mounted to a fire wall of a vehicle. A solid ball is positioned within an interior surface area of the pipe. A pair of L-shaped holding pins are provided. Each pin has an interior end, an exterior end with a pin head and a bridge therebetween. The exterior end projects from the inner side wall of the pipe. The interior end is attached to the interior surface. Lastly, a pair of toggle switches are included. Each switch is attached to an opposite outer side wall of the pipe and has a connecting wire therebetween. Each switch has a bias spring-like lever that is attached to the inner surface of the outer wall. Each lever has a projecting member that is capable of movement between the inner surface of the pipe and the switch. The projecting member turns the switch off by pressing against a switch arm of the toggle switch, when the vehicle rolls on a side and the ball rolls over the lever.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a front elevational view of the present invention.

FIG. 4 is a side elevational view of the present invention.

FIG. 5 is a cross sectional view of the present invention taken along line 5—5 of FIG. 4.

FIG. 6 is an enlarged fragmentary view of the present invention in an operable configuration.

The same reference numerals refer to the same parts through the various Figures.

DESCRIPTION OF THE PREFERRED EMBODIMENT

Figure 1:
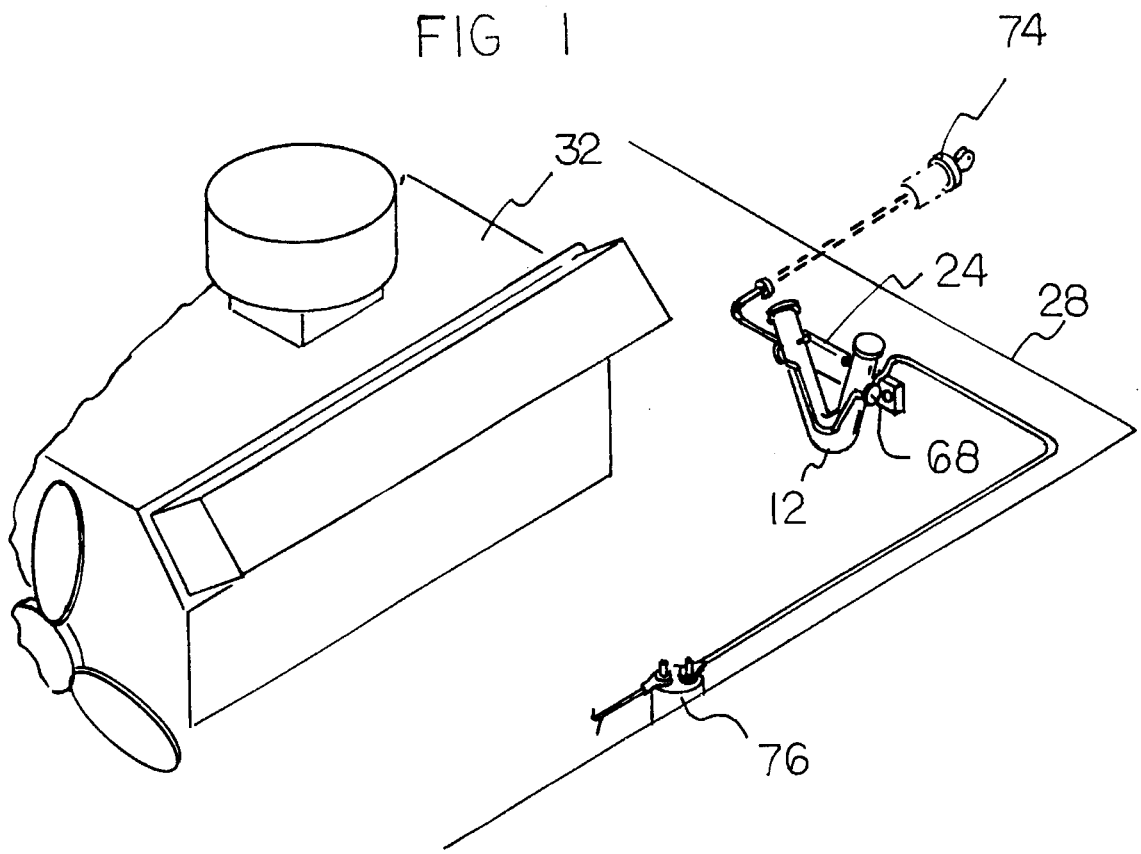
FIG. 1 is a perspective view of the preferred embodiment of the engine shut-off switch constructed in accordance with the principles of the present invention.

With reference now to the drawings, and in particular to FIG. 1 thereof, the preferred embodiment of the new and improved engine shut-off switch embodying the principles and concepts of the present invention and generally designated by the reference numeral 10 will be described.

The present invention, the engine shut-off switch 10 is comprised of a plurality of components. Such components in their broadest context include a pipe, a ball, a mounting bracket, holding pins and switching. Such components are individually configured and correlated with respect to each other so as to attain the desired objective.

Figure 2:
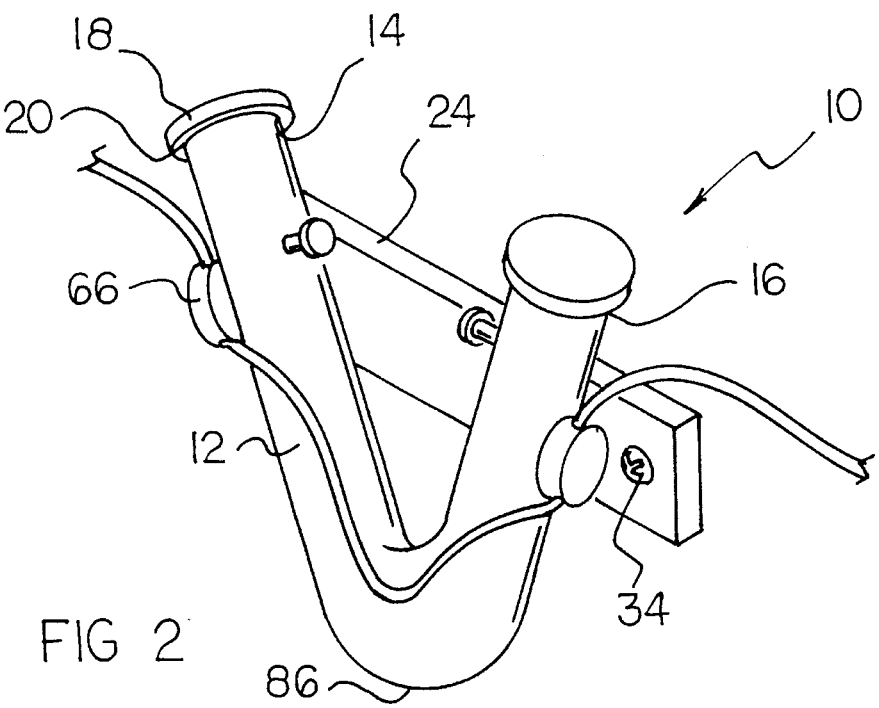
FIG. 2 is a isometric view of the present invention of FIG. 1.

Specifically, the present invention includes a generally V-shaped pipe 12 that is formed of a rigid metal or metal alloy. The pipe, as shown in FIG. 1, has a first pipe end 14 and a second pipe end 16 with each pipe end sealed with a circular disc 18. Each disc is fixedly attached to one end of the pipe by welding. The pipe has a diameter between about 1 to 2 inches and a circular cross section. The disc has a diameter slightly greater than the diameter of the pipe and forms an overhang 22, as seen in FIG. 2. The pipe has a length between about 3 to 5 inches. The pipe has a rectangular mounting bracket 24 that is fixedly attached to an underside 26 of the pipe, as seen in FIG. 4. The mounting bracket is mounted to a fire wall 28, between an engine 32 and a vehicle cab, with a pair of locking screws 34.

Included is a solid metal ball 36 that is formed of the stainless steel. The ball is in frictionless contact with an interior surface area 40 of the pipe 12, as seen in FIG. 5. The ball has a high density and a spherical diameter of about ½ to 1 inch. The ball is lubricated and placed within the pipe prior to sealing. Lubrication of the ball ensures continued frictionless contact with the interior surface area.

As best illustrated in FIG. 5, a pair of L-shaped holding pins 44 are provided. Each pin has an interior end 46, an exterior end 48 and a bridge 52 therebetween, as seen in FIG. 6. Each pin is made of a semi-flexible metal. One of the holding pins is positioned on an inner side wall 54 of the pipe while another of the holding pins is positioned on another inner side wall 56 of the pipe. The two inner side walls are integral. Each exterior end has a pin head 60, that is integral the end. The exterior end of each holding pin projects from the inner side wall of the pipe, as seen in FIG. 3. The interior end of each holding pin is fixedly attached to the interior surface 40 of one of the inner side walls. The bridge of each holding pin moves back and forth with a sliding motion and in relationship to the interior surface of the inner side wall. Each bridge is moved by pulling the pin head of the L-shaped holding pin.

Also, a pair of toggle switches 66 and 68 are included. Each switch is formed of a rigid plastic exterior with metal components. Each switch is attached to an opposite outer side wall 70 of the pipe 12. Each toggle switch has a connecting wire 72 between the two switches, as seena in FIG. 3. The pair of switches form a first switch 66 and a second switch 68. The first switch is an electrical contact with an ignition switch 74 of a vehicle. The second switch is an electrical contact with an ignition mechanism 76.

Each toggle switch has a bias spring-like lever 82 formed of metal, as shown in FIG. 6. The lever is attached to the inner surface 40 of the outer side wall 70. Each lever is opposite the bridge 52 of one of the L-shaped holding pins and forms gap 74. Each lever has a projection member 76 that is integral the lever. The projecting member is capable of movement between the inner surface 40 of the pipe and the switch. Each switch has a switching arm 84 that forms a contact bridge to pass current therethrough when the ignition switch 74 is turned on. When the vehicle is motion and the engine is running, the ball is in a resting position at a base 86 of the pipe. Also, each toggle switch is in the on position as shown in FIG. 5.

Lastly, when the vehicle begins to roll over toward one of its sides, each lever 82 is capable of interrupting the current passing across the contact bridge. Each lever, by interrupting the current, will cause each toggle switch to turn off and interrupt the ignition current. Interruption of ignition current causes the engine to cease running. Each lever turns each toggle switch off by allowing the projecting member to push against the switching arm 84.

The projecting member, pushes against the switching arm, when the vehicle is rolled over to a side and the ball rolls toward one of the ends, and passes through the gap and over the lever. The ball rolls toward the end of the pipe that coincides with the direction of the roll of the vehicle. Whereby, once the ball rolls over the lever, the ball is capable of maintaining a constant force against the lever. The bridge of one of the holding pins and the force of the lever lockingly secures the ball adjacent a respective end of the pipe, which maintains the toggle switch in an off position.

The present invention is an improved engine shut-off switch that is a safety device that will automatically shut down an engine or motor if the vehicle rolls or tips over. The engine shut-off switch is easy to install. It is simply mounted in the engine against the fire wall at the purchase of the vehicle or during the assembly of the vehicle.

When installing to an already manufactured vehicle, you simply insert the shut-off switch between the wiring that goes to the ignition mechanism. In operation, as long as the vehicle remains in a normal upright position, the ball will rest at the base of the pipe as shown in FIG. 5. When the ball is this position, each toggle switch is in an on position and the switching arm is allowing current to flow across the current bridge.

However, as soon as the vehicle tilts or begins to roll about a longitudinal axis, the ball begins to roll along the same axis. Once the vehicle reaches an angle that is sufficient to allow the ball to pass through the gap between the lever and bridge of the L-shaped holding pin, the lever presses against the switch arm and turns the toggle switch off. The toggle switch remains in the off position until such time when, as the holding pin, on that side of the pipe where the ball is positioned, is released by pulling the pin head. Once the ball is released, the vehicle ignition circuitry is again active.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An engine shutoff switch for terminating the electrical supply to an ignition within the vehicle comprising in combination:

a generally V-shaped pipe having a first pipe end and a second pipe end, each pipe end being sealed with a circular disc fixedly attached thereto, the pipe having a diameter between about 1 to 2 inches with each disc having a diameter slightly greater than the diameter of the pipe, the pipe having a length between about 3 to 5 inches, the pipe having a rectangular mounting bracket fixedly attached to an underside of the pipe, the mounting bracket capable of being mounted to a firewall between an engine and a vehicle cab;

a solid ball being in frictionless contact with an interior surface area of the pipe, the ball having a high density and a spherical diameter of about ½ to 1 inches;

a pair of L-shaped holding pins with each pin having an interior end, an exterior end and a bridge therebetween, one of the holding pins being positioned on an inner side wall of the pipe while another of the holding pins being positioned on another inner side wall of the pipe, each exterior end having a pin head, the exterior end of each holding pin projects from the inner side wall of the pipe, the interior end of each holding pin being fixedly attached to the interior surface of one of the inner side walls, the bridge of each holding pin being capable of being moved back and forth in relationship to the interior surface of the inner side wall by pulling the pin head;

a pair of toggle switches with each switch being attached to an opposite outer side wall of the pipe and having a connecting wire therebetween, the pair of switches forming a first switch and a second switch, the first switch being in electrical contact with an ignition switch of a vehicle, the second switch being in electrical contact with an ignition mechanism;

each toggle switch having a bias spring-like lever being attached to the inner surface of the outer side wall, each lever being opposite the bridge of one of the L-shaped holding pins and forming a gap therebetween, each lever having a projecting member being capable of movement between the inner surface of the pipe and the tpggle switch, each toggle switch having a switching arm being capable of forming a contact bridge for passing current therethrough when the ignition switch being turned on; and each lever being capable of interrupting the current passing across the contact bridge by allowing the projecting member to push against the switching arm, the projecting member pushes against the switching arm when the vehicle being rolled over to a side and the ball being capable of passing through the gap to roll over the lever, whereby the ball being capable of maintaining a constant force against the lever when the bridge of one of the holding pins and the force of the lever lockingly secures the ball adjacent a respective end of the pipe.

2. An engine shutoff switch comprising:

a generally V-shaped pipe having a first pipe end and a second pipe end with each pipe end being sealed, the pipe having a mounting bracket attached thereto, the mounting bracket capable of being mounted to a firewall of a vehicle;

a solid ball being positionable within an interior surface area of the pipe;

a pair of L-shaped holding pins with each pin having an interior end, an exterior end with a pin head and a bridge therebetween, the exterior end projecting from the inner side wall of the pipe, the interior end being attached to the interior surface; and a pair of toggle switches with each switch being attached to an opposite outer side wall of the pipe and having a connecting wire therebetween, each switch having a bias spring like lever being attached to the inner surface of the outer wall, each lever having a projecting member being capable of movement between the inner surface of the pipe and the switch, the projecting member being capable of turning the switch off by pressing against a switch arm of the toggle switch when the vehicle rolls on a side and the ball rolls over the lever.

3. The engine shutoff switch as set forth in claim 2 wherein each end of the pipe being sealed with a circular disc having been fixedly attached thereto, the pipe having a diameter between about 1 to 2 inches with each disc having a diameter slightly greater than the diameter of the pipe, the pipe having a length between about 3 to 5 inches, and the mounting bracket being fixedly attached to an underside of the pipe.

4. The engine shutoff switch as set forth in claim 3 wherein the ball having a high density and being in frictionless contact with the interior surface area of the pipe, and the ball having a spherical diameter of about ½ to 1 inches.

5. The engine shutoff switch as set forth in claim 2 wherein the bridge of each holding pin being capable of being moved back and forth in relationship to the interior surface of the inner side wall by pulling the pin head, one of the holding pins being positioned on the inner side wall of the pipe while another of the holding pins being positioned on another inner side wall of the pipe, and the interior end of each holding pin being fixedly attached to the interior surface of the inner side wall.

6. The engine shutoff switch as set forth in claim 2 wherein the pair of toggle switches forming a first switch and a second switch, the first switch being in electrical contact with an ignition switch of a vehicle, the second switch being in electrical contact with the ignition, and each switch being in an on position at the time the ignition switch being activated.

7. The engine shutoff switch as set forth in claim 6 wherein each lever of each toggle switch being opposite the bridge of one of the L-shaped holding pins and forming a gap therebetween, and the switching arm of each switch being capable of forming a contact bridge for passing current when the ignition switch being activated and in the on position.

8. The engine shutoff switch as set forth in claim 7 wherein each toggle switch being capable of having the lever interrupt the current passing across the contact bridge when the projecting member pushes against the switching arm, and the ball being capable of maintaining a constant force against the lever when the bridge of one of the holding pins and the force of the lever lockingly secures the ball adjacent a respective end of the pipe.

* * * * *